United States Patent Office 2,779,125
Patented Jan. 29, 1957

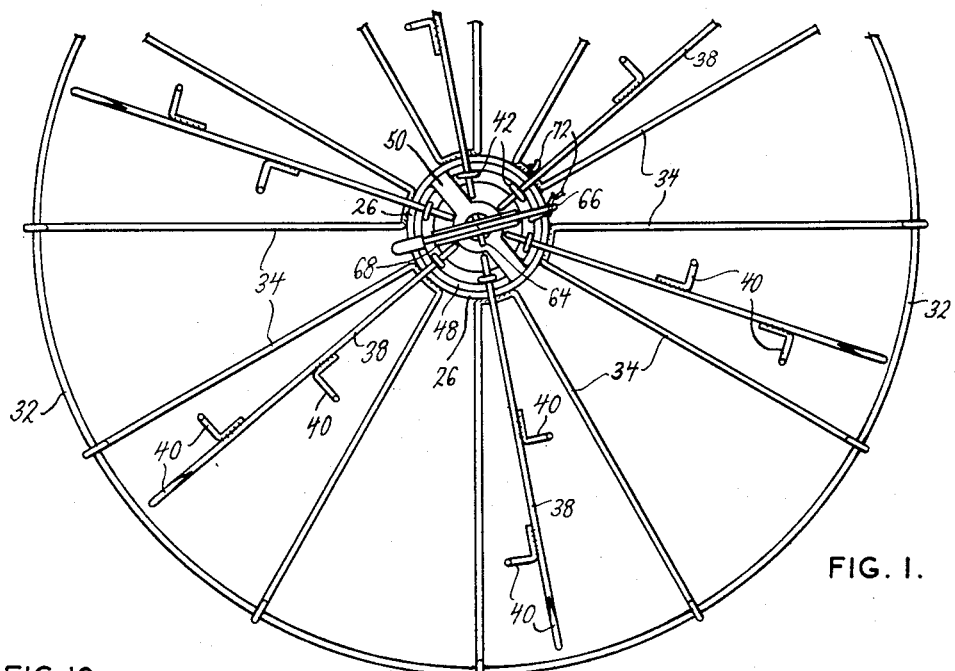
FIG. 1.
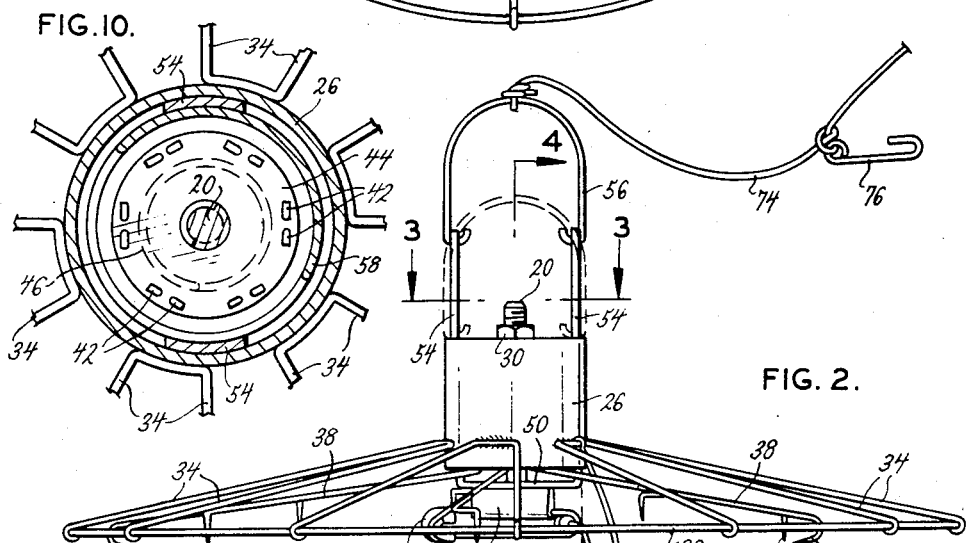
FIG. 10.
FIG. 2.
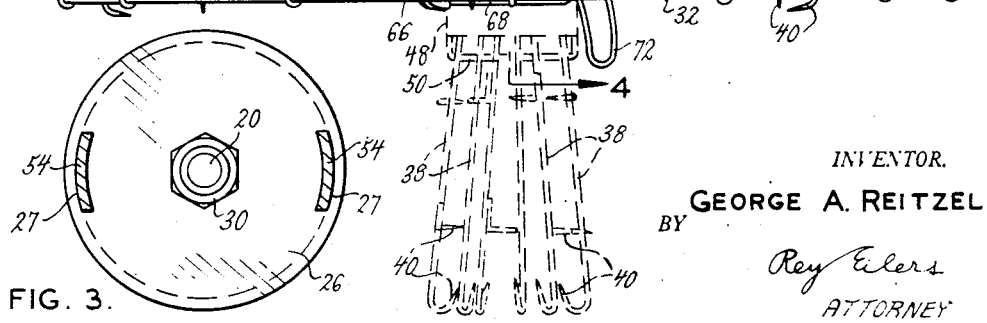
FIG. 3.
INVENTOR.
GEORGE A. REITZEL
BY Rey Eilers
ATTORNEY Jan. 29, 1957  G. A. REITZEL  2,779,125
TRAPS
Filed June 18, 1954  2 Sheets-Sheet 2
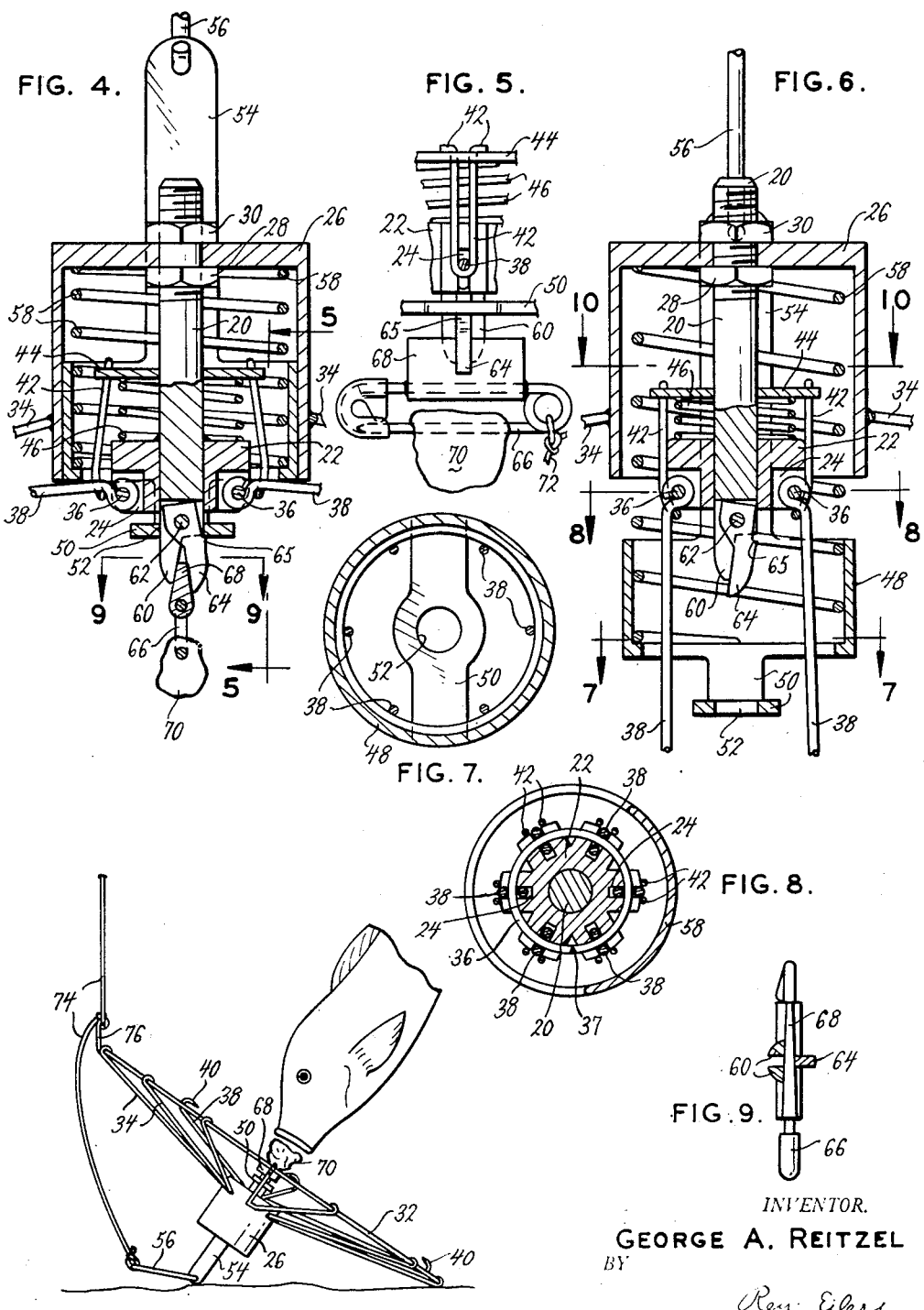
INVENTOR.
GEORGE A. REITZEL
BY
Roy Eilers
ATTORNEY

2,779,125

TRAPS

George A. Reitzel, St. Louis, Mo.

Application June 18, 1954, Serial No. 437,735

16 Claims. (Cl. 43—100)

This invention relates to improvements in traps. More particularly this invention relates to improvements in traps that can be used to trap aquatic creatures.

It is therefore an object of the present invention to provide an improved trap that can trap aquatic creatures.

Aquatic creatures, such as fish, crabs, and the like, can be caught in nets or seines, but the use of nets and seines can involve many hours of arduous work. Such creatures can also be caught on baited hooks suspended from a line that is held in a body of water such as a river or lake. However, it has been found that in many cases the fish are able to disengage themselves from the hooks and thus avoid capture. For these reasons, the use of nets or seines, and the use of baited hooks suspended from stationary lines, is objectionable. The present invention obviates these objections by providing a trap which obviates the long and arduous manipulation of the nets and seines and also prevents the escape of the aquatic creature. The trap can be set in the water and it can be retrieved after a suitable period of time, and if a fish has trifled with the bait, that fish will be caught in the trap. Similarly, if a crab or other aquatic creature trifles with the bait, that creature will also be caught in the trap. It is therefore an object of the present invention to provide a trap which can trap and hold aquatic creatures.

The trap provided by the present invention has a support to which a number of jaws are pivoted. These jaws have barbs at their free ends and also have barbs intermediate the ends thereof. These jaws will initially be held apart but will snap together and trap the aquatic creature which trifles with the bait. The barbs on the free ends of the jaws should provide full impaling of large aquatic creatures, and the barbs which are intermediate the free ends of the jaws and the support will assure full impaling of smaller aquatic creatures. As a result, the trap provided by the present invention can trap and hold aquatic creatures of different sizes. It is therefore an object of the present invention to provide an aquatic trap with jaws that have barbs spaced along the length thereof.

The pivoted jaws of the trap provided by the present invention are initially held apart from each other by a spring. This spring thus enables the jaws to be held apart irrespective of the attitude or position of the trap. As a result, the setting or attitude of the trap is not critical, and this is very desirable. In the absence of this independence of the attitude or position of the trap, the trap would have to be carefully set; and this is difficult where the trap is to be used under water. It is therefore an object of the present invention to provide a trap with a plurality of pivoted jaws that are initially held apart by a spring.

The spring which initially holds the jaws of the trap apart can be overcome by a more powerful spring which goes into action whenever the trigger is tripped. However, until the trigger is tripped, the spring which holds the jaws apart will be fully effective in holding those jaws away from each other. Hence, the trap provided by the present invention has a differential spring action which is controlled by the trigger. Until the trigger is tripped, the lighter spring fully holds the jaws of the trap apart, but when the trigger is tripped, the heavier spring fully overcomes the force of the lighter spring. It is therefore an object of the present invention to provide a trap with a spring that holds the jaws apart before the trigger is tripped and to provide a spring which will force the jaws together and which will overcome the force of the first spring whenever the trigger is tripped.

The use to which any trap can be put is limited by the force required to trip the trigger. As a result, many traps are useful for only one size of aquatic creature while other traps are useable only with smaller size aquatic creatures. The present invention provides a trap that is useable with many different sizes of aquatic creatures, and it does so by providing an adjustment for the force required to trip the trigger. Where large aquatic creatures are to be trapped, the adjustment is set so that a considerable force is required to trip the trigger. On the other hand, where the trap is to be used with small aquatic creatures, the adjustment is set so a very light pull will trip the trigger. It is therefore an object of the present invention to provide a trap for aquatic creatures which has an adjustable-tension trigger.

The trigger provided by the present invention consists of two jaws that have the free ends thereof movable toward and away from each other. These jaws telescope through an opening in the actuator of the trap and when the free ends of the jaws are held apart the actuator cannot telescope over those jaws. However, the jaws define outwardly diverging surfaces which the actuator will engage and try to force together. Consequently, when the jaws are not held apart, the actuator will force them together and telescope past those jaws to trip the trap. The inclination of the diverging jaws facilitates automatic and rapid tripping of the trap as soon as the trigger is set off. It is therefore an object of the present invention to provide a trap with two relatively movable jaws which extend through an opening in the actuator of the trap and which diverge to provide oppositely inclined surfaces engaged by the actuator.

The relatively movable jaws of the trigger of the trap provided by the present invention are normally spaced apart by a bait carrier. This bait carrier has a tapered plate and that plate normally extends between the jaws of the trigger. The inclination provided by the taper on the bait carrier permits light pulls on the bait to free the bait carrier and snap the trap closed. In this way, the trap can respond to the action of even small aquatic creatures. It is therefore an object of the present invention to provide a bait carrier with a tapered plate that can be disposed between the jaws of the trigger of that trap.

The taper on the tapered plate of the bait carrier is made to vary along the length of that plate. This is desirable since it enables the angler to attain different pressures on the bait carrier. This is very desirable since it enables the angler to attain just the required amount of tension for the particular aquatic creatures he seeks. It is therefore an object of the present invention to provide a tapered plate for the bait carrier of traps which has a taper that varies throughout the length of that plate.

The trap provided by the present invention has a guard which extends outwardly from the central support of that trap and which will coact with that central support to hold the jaws of the trap out of engagement with the surface on which the trap is set. This is desirable since it enables the jaws to move freely without striking roots, rocks or other objects resting on the bottom of the creek, river, bay, lake or harbor. As a result of the use of this guard, it is possible to place the trap in a body of water without any need for a careful search and study of the bottom surface of that body of water. This, of course, is desirable since it speeds up the placing of the traps. It is therefore an object of the present invention to provide a trap with a guard that enables the jaws of the trap to operate freely when the trap is resting on the bottom of a body of water.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

In the drawing:

Fig. 1 is a partial plan view of a trap that is made in accordance with the principles and teachings of the present invention, and it shows that trap with the jaws thereof spaced apart from each other, Fig. 2 is a side elevational view of the trap of Fig. 1, but it shows that trap inverted, Fig. 3 is a cross sectional view of a portion of the trap of Figs. 1 and 2, and it is taken along the plane indicated by the line 3—3 in Fig. 2, Fig. 4 is a cross sectional view of another portion of the trap of Figs. 1 and 2, and it is taken along the plane indicated by the line 4—4 in Fig. 2, Fig. 5 is another cross sectional view of a portion of the trap of Figs. 1 and 2, and it is taken along the plane indicated by the line 5—5 in Fig. 4, Fig. 6 is a cross sectional view of a portion of the trap shown in Figs. 1 and 2, and it is taken along the plane indicated by the line 4—4 in Fig. 2, but it shows the trap in trapping position, Fig. 7 is a cross sectional plan view of a part of the trap shown in Figs. 1 and 2, and it is taken along the plane indicated by the line 7—7 in Fig. 6, Fig. 8 is another cross sectional view in plan of a portion of the trap shown in Figs. 1 and 2, and it is taken along the plane indicated by the line 8—8 in Fig. 6.

Fig. 9 is a cross sectional view in plan of the trigger of the trap shown in Figs. 1 and 2, and it is taken along the plane indicated by the line 9—9 in Fig. 4, Fig. 10 is a sectional view in plan of still another portion of the trap of Figs. 1 and 2, and it is taken along the plane indicated by the line 10—10 in Fig. 6, and Fig. 11 is a side elevational view of the trap of Figs. 1 and 2 as that trap is in use.

Referring to the drawing in detail, the numeral 20 denotes an elongated rod which is threaded at one end. A collar 22 is mounted on the rod 20 adjacent the unthreaded end thereof, and that collar will be suitably secured to the rod 20 so that the two are inseparable. A number of radially directed slots 24 are formed in the collar 22, and those slots extend inwardly from the outer periphery of that collar. A nut 28 is threaded onto the threaded end of the rod 20, and a cup-shaped enclosure 26 telescopes over the threaded end of the rod 20 and bears against the nut 28. A second nut 30 also telescopes over the threaded end of the rod 20 and that nut will normally bear against the outer end of the cup-shaped enclosure 26. However, the nut 30 can be rotated backwardly along the threaded end of the rod 20 to provide an adjustment, as will be explained more fully hereinafter.

The threaded rod 20, the collar 22, the slots 24 in the collar 22, the cup-shaped enclosure 26 and the nuts 28 and 30 constitute a central support for the trap provided by the present invention. This central support will remain substantially stationary during the setting and tripping of the trap.

The numeral 32 denotes an annular element, preferably made of stiff wire or rod, which is concentric with the central support of the trap. A plurality of studs 34, which are shown to be V-shaped wires or rods, extend between the central support and the guard 32. The closed ends of the V will be suitably secured to the cup-shaped enclosure 26, as by brazing, soldering, welding or the like, and the free ends of the struts 34 will be secured to the guard 32, as by being bent around that guard. The struts will maintain the guard 32 in assembled relation with the central support of the trap and will hold that guard substantially rigid relative to the central support.

The numeral 36 denotes a ring that is mounted on the collar 22 and that spans the slots 24 in that collar. This ring, in effect, provides a number of circumferentially spaced pivots that receive eyes in the ends of jaws 38. These jaws are elongated and slender, and they have barbs 40 at the free ends thereof and have other barbs 40 intermediate the ends thereof. These barbs will impale any aquatic creatures which are within their range when the trap is sprung. The joint in the ring 36 is suitably soldered or welded at 37.

The numeral 42 denotes a number of generally U-shaped links which have the closed ends thereof telescoped over the inner ends of the jaws 38. These links have the ends thereof extending through spaced openings in an annular plate 44, and those ends are then bent over and outwardly. The result is that the links 42 are maintained in permanently assembled relation with the annular plate 44. A helical spring 46 encircles the rod 20 and has one end bearing against the collar 22 and has the other end bearing against the annular plate 44. This spring will bias the annular plate 44 away from the collar 22 and will thus bias the links 42 toward the threaded end of the rod 20. This bias on the links 42 will cause those links to bias the jaws 38 for movement to the position shown in Figs. 1, 2, 4 and 11. Consequently, whenever the spring 46 is allowed to do so, it will hold the jaws 38 spaced apart as shown in Figs. 1, 2, 4 and 11. This is desirable since it enables those jaws to be spaced apart whether the trap is set with the support down, up, or on one side.

The numeral 48 denotes a sleeve which has a bridge 50 formed at one end thereof. An opening 52 is provided in the bridge 50, and that opening is concentric with the sleeve 48. The sleeve 48 has axially extending projections at the end thereof opposite to the bridge 50, and those projections extend parallel to each other. A bail 56 is mounted in openings in the free ends of the axially extending projections 54. The bail can rotate freely relative to those projections. The sleeve 48, the bridge 50, the axially extending projections 54 and the bail 56 constitute the actuator of the trap provided by the present invention.

As emphasized particularly by Fig. 4, the sleeve 48 of the actuator telescopes within the cup-shaped enclosure 26 of the central support. As emphasized particularly in Fig. 3, the axially extending projections 54 project through spaced openings 27 in the closed end of the cup-shaped enclosure 26 of the central support. The bridge 50 is in register with the collar 22 on the threaded rod 20, and the opening 52 in the bridge 50 receives the unthreaded end of the rod 20.

A helical spring 58 is disposed within the cup-shaped enclosure 26 of the central support, and one end of that spring bears against the closed end of that enclosure. The other end of that spring bears against an inwardly extending flange on the sleeve 48 of the actuator. Hence, the spring 58 biases the actuator away from the central support. Such movement is limited, however, by the inturned portions of the bail 56, because those inturned portions of the bail cannot pass through the openings 27 in the enclosure 26.

The unthreaded end of the rod 20 has a portion thereof defining a slotted jaw 60. A pivot 62 is mounted on rod 20 adjacent jaw 60, and it supports movable jaw 64 in register with the slot in the slotted jaw 60, and the jaws 60 and 64 coact with the pivot 62 to provide the trigger for the trap. The bottom of the jaw 64 is cut away at an angle, as shown in Figs. 4 and 6; and that bottom coacts with the bottom of the slot, in jaw 60, to limit clockwise rotation of jaw 64 to the position of Fig. 6 and to limit counterclockwise rotation of jaw 64 to the position of Fig. 4. When the free ends of the jaws 60 and 64 are adjacent each other, as in Fig. 6, those jaws define a transverse dimension which is less than the diameter of the opening 52 in the bridge 50, but when spaced apart as in Figs. 4 and 9, those jaws define a transverse dimension which is greater than the diameter of the opening 52 in the bridge 50. Consequently, when the jaws are close together the opening 52 in the bridge 50 can telescope freely over those jaws, particularly since the upper ends of those jaws are tapered; but when those jaws are spaced apart, as in Figs. 4 and 9, the opening 52 in the bridge 50 cannot telescope over those jaws.

When the jaws 60 and 64 are spaced apart, as shown in Figs. 4 and 9, the outer edges thereof define diverging surfaces. Those surfaces will coact with the portion of bridge 50 that defines the opening 52 to apply pressure to the jaws 60 and 64 to move toward each other. That pressure can be resisted by a bait carrier until such time as an aquatic creature pulls the bait carrier from between the jaws, and thereafter the bridge 50 will telescope over and beyond the jaws 60 and 64. A small projection 65 is formed on jaw 64, and that projection helps hold the bridge 50 against telescoping movement relative to the jaws 60 and 64. The bait carrier provided by the present invention can be made inexpensively and readily from a safety pin 66 which has a tapered plate 68 formed on the closed side thereof. Other suitable forms of bait carriers could be provided but the particular form shown is very useful. In any event, the bait carrier should have a tapered plate such as the plate 68, and the taper should vary throughout its length. This is best shown in Fig. 9. The variable nature of the taper provided for the plate 68 will enable that plate to vary the tension that must be applied to the bait carrier to dislodge it from the jaws 60 and 64. As a result, the user of the trap provided by the present invention can readily set that trap for aquatic creatures of the desired size and strength. The bait carrier will be openable to receive bait 70, and can then be closed to prevent accidental dislodgment of that bait. A length of string 72 is secured to the bait carrier and to the guard 32 to prevent loss of the bait carrier whenever the trap is snapped.

The user of the trap can adjust the tension required to dislodge the bait carrier by setting different sections of the tapered plate 68 between the jaws 60 and 64. The user can also adjust the tension which must be applied to the bait carrier to trip the trigger by adjusting the position of the nut 30 on the rod 20. If the nut 30 is threaded to the position shown in Fig. 6, the tension initially stored in the spring 58 will be at a maximum. Hence, a considerable force will be required to dislodge the bait carrier from the trigger. If the nut 30 is backed off toward the upper end of the threaded rod 20, the pressure initially stored in the spring 58 will be less, and a smaller force will suffice to trip the trigger. As a result, the user can attain very precise settings of the force he wishes the aquatic creatures to use before the trigger will be tripped.

A line 74 of heavy weight will be affixed to the bail 56, and that line will be suitably secured to a buoy or other support above the surface of the water. A readily bendable hook 76 will be secured to the line 74 intermediate its length and that hook will be connected loosely to the guard 32. This hook will enable the user to lower the trap to the bottom of a body of water so that the guard 38 will engage the bottom and then the trap will move to the position shown in Fig. 11. However, it may be desirable for the hook 76 to bend and separate itself from the guard 38 in the event the aquatic creature pulls the trap behind some immovable object. At such time, a direct pull may be very desirable, and that direct pull can be made by causing the hook 76 to open up and permit the line 74 to act directly, and in a straight line, on the bail 56.

To set the trap provided by the present invention, the user will grasp the enclosure 26 of the central support with one hand and will pull on the bail 56 with the other. The bail will transmit the pull to the projections 54 and will thus force the sleeve 48 to telescope within the enclosure 26. The spring 58 will be compressed in the process, and the opening 52 in the bridge 50 will telescope over the jaws 60 and 64. The user will then use the thumb and index finger of one hand to grasp the enclosure and will use the remaining three fingers to grip the bail 56, thereby freeing the other hand for manipulation of the jaws 60 and 64 and the bait carrier. The user will grasp the bait carrier and apply the plate 68 against the movable jaw 64 until the free ends of the jaws 60 and 64 are spaced apart. Thereupon the tapered plate 68 is set between those jaws, and the position of the plate relative to those jaws will determine the force required of the aquatic creature in tripping the trap. Once the tapered plate 68 has been set in position, the three remaining fingers of the first hand can be loosened so that the bail 56 can move under the action of the spring 58. The spring will then urge the bridge 50 of the actuator toward the jaws 60 and 64, but at this time those jaws will define a transverse dimension which is greater than the diameter of the opening 52. Hence, the opening 52 will be unable to telescope over those jaws, and instead it will bear against the diverging surfaces defined by those jaws. As long as the bait carrier remains in position, the jaws 38 of the trap will be held apart as indicated in Figs. 1, 2, 4 and 11. However, as soon as the bait carrier is dislodged, the actuator will force those jaws to rotate from the position of Fig. 4 to the position of Fig. 6, and those jaws will snap to that position and trap the aquatic creature that dislodged the bait carrier. The inwardly directed flange of the actuator is the jaw-engaging surface of that actuator and it is disposed outwardly of but closely adjacent the pivots 36. Hence, that surface can have a considerable mechanical advantage in rotating the jaws 38. Specifically, a short movement of the actuator will cause a considerable movement of the jaws 38.

The spring 58 is appreciably stronger than the spring 46, and it will readily overcome the force of the spring 46 and force the jaws 38 together when the trigger has been tripped.

The trap provided by the present invention provides two adjustments of the force required to dislodge the bait carrier, and it provides rapid and immediate closing of the trap when that carrier is dislodged. Accordingly, the trap provided by the present invention is very effective in trapping aquatic creatures.

Whereas a preferred embodiment of the present invention has been shown and described in the drawing and accompanying description, it should be apparent to those skilled in the art that various changes may be made in the form of the invention without affecting the scope thereof.

What I claim is:

1. A trap that comprises a support, a plurality of pivots carried by said support, a plurality of jaws that are secured to said support by said pivots and that are oscillatable about said pivots, an actuator that is movable relative to said support and said jaws, said actuator being movable to setting position to permit said jaws to be moved away from each other and being movable to trapping position to move said jaws toward each other, a trigger engaging and holding said actuator in setting position, a spring engaging said actuator that biases said actuator for movement to trapping position, and a second spring engaging said support that biases said jaws toward setting position, the first said spring overcoming said second spring and moving said actuator to trapping position whenever said trigger is tripped.

2. A trap that comprises a support, a plurality of pivots carried by said support, a plurality of jaws that are secured to said support by said pivots and that are oscillatable about said pivots, an actuator that is movable relative to said support and said jaws, said actuator being movable relative to said support and said jaws, said actuator being movable to setting position to permit said jaws to be moved away from each other and being movable to trapping position to move said jaws toward each other, a trigger engaging and holding said actuator in setting position, a spring engaging said actuator that biases said actuator for movement to trapping position, and a second spring engaging said support that biases said jaws toward setting position, the first said spring overcoming said second spring and moving said actuator to trapping position whenever said trigger is tripped, said actuator being a sleeve that telescopes over and encloses said support, said actuator having a jaw-engaging surface that is disposed outwardly of but closely adjacent to said pivots whereby said jaw-engaging surface on said actuator can engage those portions of said jaws that are closely adjacent said pivots.

3. A trap that comprises a support, a plurality of pivots carried by said support, a plurality of jaws that are secured to said support by said pivots and that are oscillatable about said pivots, an actuator that is movable relative to said support and said jaws, said actuator being movable to setting position to permit said jaws to be moved away from each other and being movable to trapping position to move said jaws toward each other, a trigger engaging and holding said actuator in setting position, a spring engaging said actuator that biases said actuator for movement to trapping position, and a second spring engaging said support that biases said jaws toward setting position, the first said spring overcoming said second spring and moving said actuator to trapping position whenever said trigger is tripped, said jaws being elongated hooks that have barbs at the free ends thereof and have additional barbs intermediate their ends.

4. A trap that comprises a support, a plurality of pivots carried by said support, a plurality of jaws that are secured to said support by said pivots and that are oscillatable about said pivots, an actuator that is movable relative to said support and said jaws, said actuator being movable to setting position to permit said jaws to be moved away from each other and being movable to trapping position to move said jaws toward each other, a trigger engaging and holding said actuator in setting position, a spring engaging said actuator that biases said actuator for movement to trapping position, and a second spring engaging said support that biases said jaws toward setting position, the first said spring being stronger than said second spring and overcoming said second spring and moving said actuator to trapping position whenever said trigger is tripped, said second spring holding said jaws away from each other while said actuator is in setting position irrespective of the position of said trap.

5. A trap that comprises a support, a plurality of jaws that are pivotally mounted on said support, an actuator that is movable relative to said support and said jaws, said actuator being movable to setting position to permit said jaws to be moved to setting position and that is movable to trapping position to move said jaws to trapping position, a trigger engaging and holding said actuator in setting position, a spring engaging said actuator that biases said actuator for movement to trapping position, and a second spring engaging said support that biases said jaws toward setting position, the first said spring overcoming said second spring and moving said actuator to trapping position whenever said trigger is tripped.

6. A trap that comprises a support, a plurality of jaws that are pivotally mounted on said support, an actuator that is movable relative to said support and said jaws, said actuator being movable to setting position to permit said jaws to be moved to setting position and that is movable to trapping position to move said jaws to trapping position, a trigger engaging and holding said actuator in setting position, a spring engaging said actuator that biases said actuator for movement to trapping position, a plurality of links that engage said jaws and can move said jaws to trapping position, and a second spring engaging said support that biases said links and said jaws to trapping position, the first said spring being stronger than said second spring.

7. A trap that comprises a support, a plurality of jaws that are pivotally mounted on said support, an actuator that is movable relative to said support and said jaws, said actuator being movable to setting position to permit said jaws to be moved to setting position and that is movable to trapping position to move said jaws to trapping position, a trigger that releasably holds said actuator in setting position, said trigger including two relatively movable jaws, the free ends of said jaws of said trigger being movable toward each other to define a predetermined transverse dimension and being movable away from each other to define a larger transverse dimension, said actuator having an opening therethrough that can telescope over and receive said jaws of said trigger, said opening having a transverse dimension that is larger than the first said transverse dimension but is smaller than said second transverse dimension.

8. A trap that comprises a support, a plurality of jaws that are pivotally mounted on said support, an actuator that is movable relative to said support and said jaws, said actuator being movable to setting position to permit said jaws to be moved to setting position and that is movable to trapping position to move said jaws to trapping position, a trigger that releasably holds said actuator in setting position, said trigger including two relatively movable jaws, the free ends of said jaws of said trigger being movable toward each other to define a predetermined transverse dimension and being movable away from each other to define a larger transverse dimension, said actuator having an opening therethrough that can telescope over and receive said jaws of said trigger, said opening having a transverse dimension that is larger than the first said transverse dimension but is smaller than said second transverse dimension, one of the jaws of said trigger being an extension of said support, the other of said jaws of said trigger being pivoted to the first said jaw of said support.

9. A trap that comprises a support, a plurality of jaws that are pivotally mounted on said support, an actuator that is movable relative to said support and said jaws, said actuator being movable to setting position to permit said jaws to be moved to setting position and that is movable to trapping position to move said jaws to trapping position, a trigger that releasably holds said actuator in setting position, said trigger including two relatively movable jaws, the free ends of said jaws of said trigger being movable toward each other to define a predetermined transverse dimension and being movable away from each other to define a larger transverse dimension, said actuator having an opening therethrough that can telescope over and receive said jaws of said trigger, said opening having a transverse dimension that is larger than the first said transverse dimension but is smaller than said second transverse dimension, said jaws of said trigger presenting diverging surfaces to the portion of said actuator that defines said opening, said portion of said actuator forcing said jaws of said trigger toward each other when said trigger is tripped.

10. A trap that comprises a support, a plurality of jaws that are pivotally mounted on said support, an actuator that is movable relative to said support and said jaws, said actuator being movable to setting position to permit said jaws to be moved to setting position and that is movable to trapping position to move said jaws to trapping position, a trigger that releasably holds said actuator in setting position, said trigger including two relatively movable jaws, the free ends of said jaws of said trigger being movable toward each other to define a predetermined transverse dimension and being movable away from each other to define a larger transverse dimension, said actuator having an opening therethrough that can telescope over and receive said jaws of said trigger, said opening having a transverse dimension that is larger than the first said transverse dimension but is smaller than said second transverse dimension, and a bait carrier, said bait carrier being releasably disposable between the free ends of said jaws of said trigger to hold said free ends of said jaws away from each other.

11. A trap that comprises a support, a plurality of jaws that are pivotally mounted on said support, an actuator that is movable relative to said support and said jaws, said actuator being movable to setting position to permit said jaws to be moved to setting position and that is movable to trapping position to move said jaws to trapping position, a trigger that releasably holds said actuator in setting position, said trigger including two relatively movable jaws, the free ends of said jaws of said trigger being movable toward each other to define a predetermined transverse dimension and being movable away from each other to define a larger transverse dimension, said actuator having an opening therethrough that can telescope over and receive said jaws of said trigger, said opening having a transverse dimension that is larger than the first said transverse dimension but is smaller than said second transverse dimension, and a bait carrier, said bait carrier being releasably disposable between the free ends of said jaws of said trigger to hold said free ends of said jaws away from each other, said bait carrier having a tapered edge that is disposable between said free ends of said jaws of said trigger.

12. A trap that comprises a support, a plurality of jaws that are pivotally mounted on said support, an actuator that is movable relative to said support and said jaws, said actuator being movable to setting position to permit said jaws to be moved to setting position and that is movable to trapping position to move said jaws to trapping position, a trigger that releasably holds said actuator in setting position, said trigger including two relatively movable jaws, the free ends of said jaws of said trigger being movable toward each other to define a predetermined transverse dimension and being movable away from each other to define a larger transverse dimension, said actuator having an opening therethrough that can telescope over and receive said jaws of said trigger, said opening having a transverse dimension that is larger than the first said transverse dimension but is smaller than said second transverse dimension, and a bait carrier, said bait carrier being releasably disposable between the free ends of said jaws of said trigger to hold said free ends of said jaws away from each other, said bait carrier having a tapered edge that is disposable between said free ends of said jaws of said trigger, the taper of said tapered edge being of varying inclination throughout the length of said edge.

13. A trap that comprises a support, a plurality of jaws that are pivotally mounted on said support, an actuator that is movable relative to said support and said jaws, said actuator being movable to setting position to permit said jaws to be moved to setting position and that is movable to trapping position to move said jaws to trapping position, a trigger engaging and holding said actuator in setting position, and a guard, said guard extending outwardly from said support, said guard being disposed beyond the path of movement of said jaws whereby said jaws can move freely without interference from said guard, said guard coacting with said support to hold said jaws away from a surface on which said trap rests.

14. A trap that comprises a support, a plurality of jaws that are pivotally mounted on said support, an actuator that is movable relative to said support and said jaws, said actuator being movable to setting position to permit said jaws to be moved to setting position and that is movable to trapping position to move said jaws to trapping position, a trigger that releasably holds said actuator in setting position, and a guard, said guard extending outwardly from said support, said guard being disposed beyond the path of movement of said jaws whereby said jaws can move freely without interference from said guard, said guard coacting with said support to hold said jaws away from a surface on which said trap rests, said guard being annular in form and being secured to said support by struts.

15. A trap that comprises a support, a plurality of jaws that are pivotally mounted on said support, an actuator that is movable relative to said support and said jaws, said actuator being movable to setting position to permit said jaws to be moved to setting position and that is movable to trapping position to move said jaws to trapping position, a trigger that releasably holds said actuator in setting position, a spring that biases said actuator for movement to trapping position, and an adjustment means that can vary the initial force of said spring.

16. A trap that comprises a support, a plurality of jaws that are pivotally mounted on said support, an actuator that is movable relative to said support and said jaws, said actuator being movable to setting position to permit said jaws to be moved to setting position and that is movable to trapping position to move said jaws to trapping position, a trigger that releasably holds said actuator in setting position, a spring that biases said actuator for movement to trapping position, and an adjustment that can vary the initial force of said spring, said adjustment means including a threaded rod and a nut.

References Cited in the file of this patent

UNITED STATES PATENTS

| | | |
|---|---|---|
| 1,215,938 | Jay | Feb. 13, 1917 |
| 2,162,241 | Boyce | June 13, 1939 |
| 2,439,391 | Jobson | Apr. 13, 1948 |
| 2,656,642 | Richa | Oct. 27, 1953 |
| 2,703,423 | Hunt | Mar. 8, 1955 |

FOREIGN PATENTS

| | | |
|---|---|---|
| 5,445 | Great Britain | Mar. 11, 1908 |